Fig_1

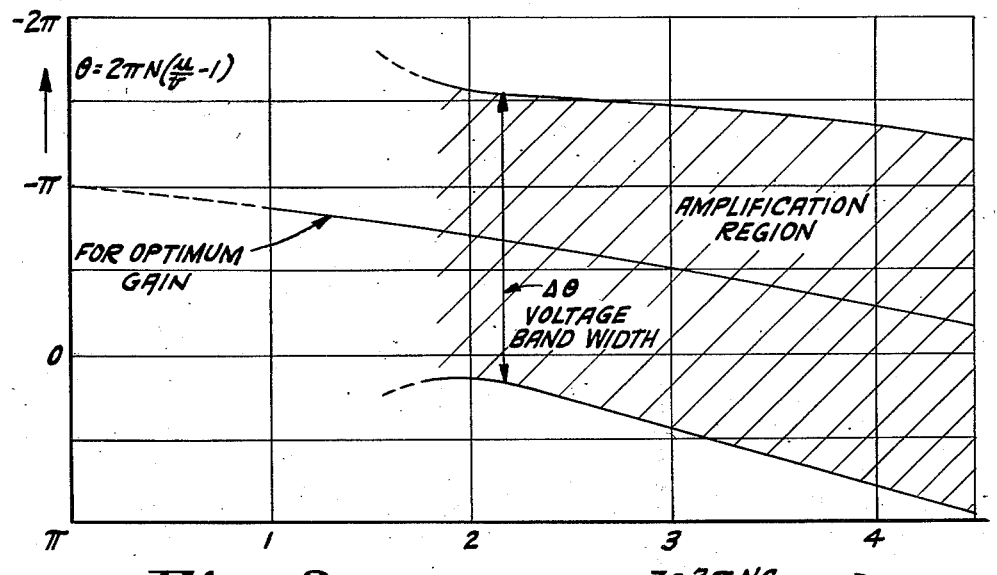
Fig. 2
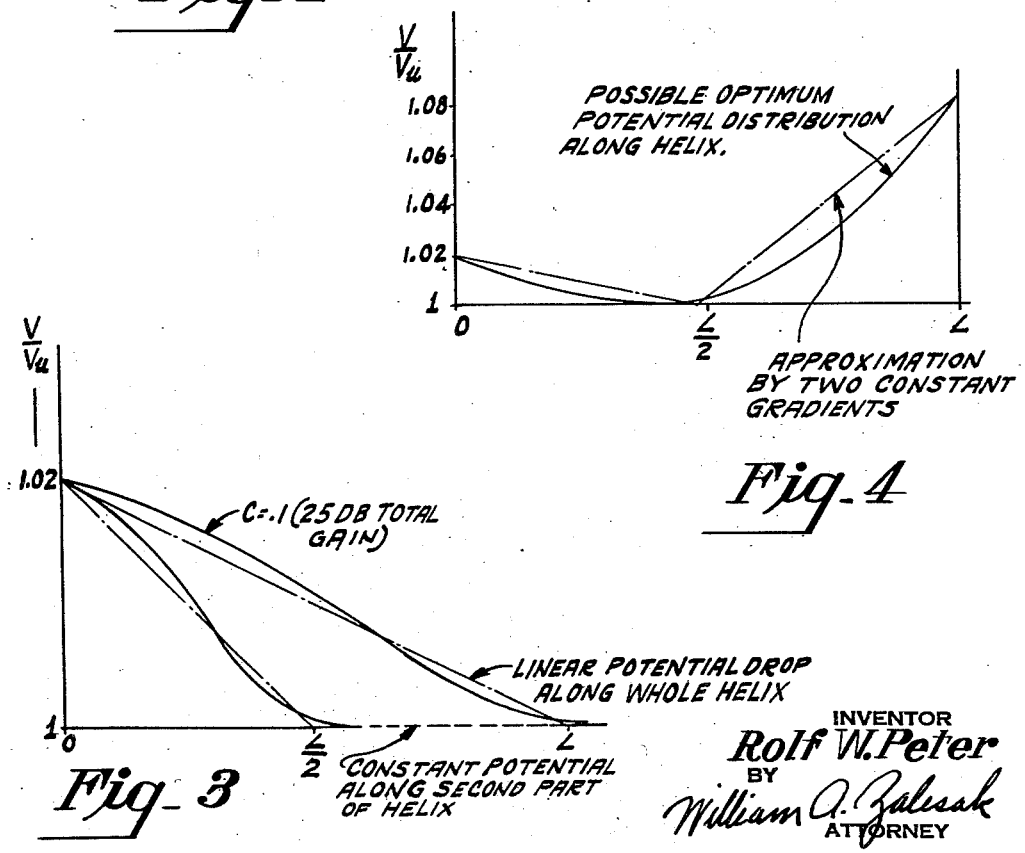
Fig. 3
Fig. 4

Dec. 17, 1957  R. W. PETER  2,817,037
TRAVELLING WAVE ELECTRON TUBES AND CIRCUITS
Filed Aug. 4, 1951  3 Sheets-Sheet 3
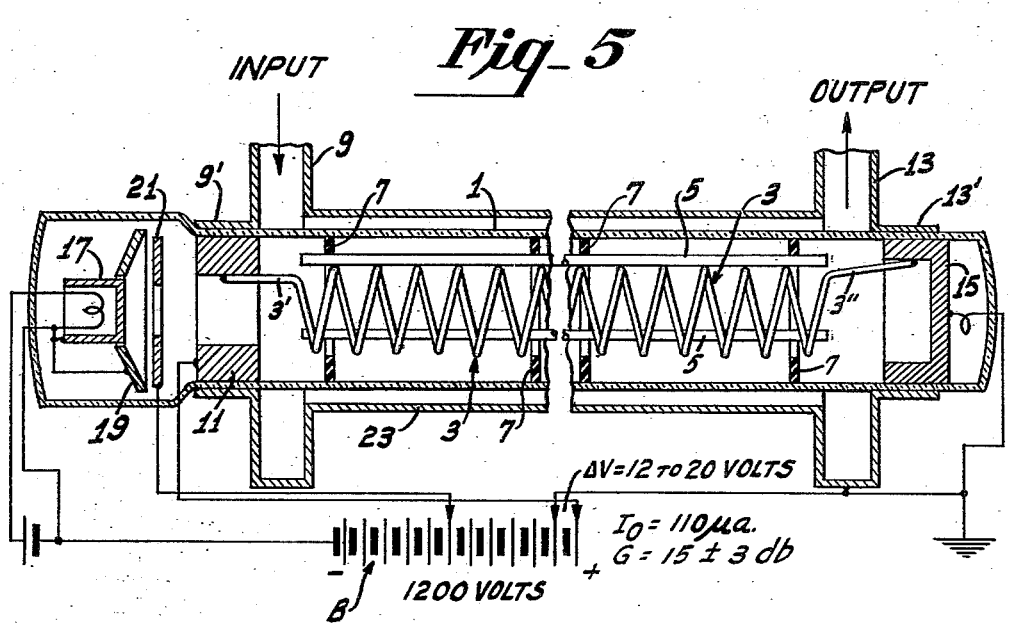
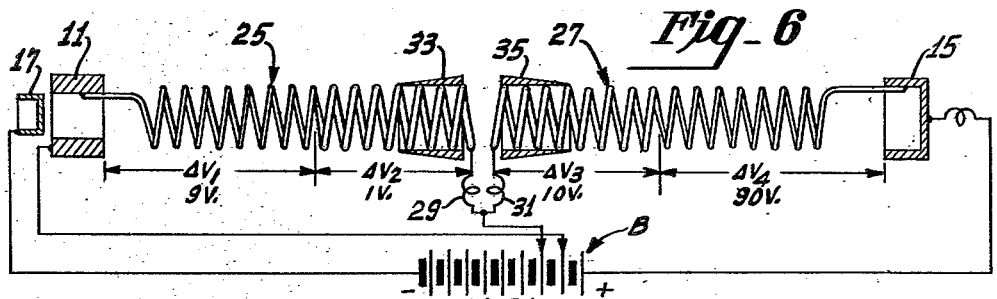
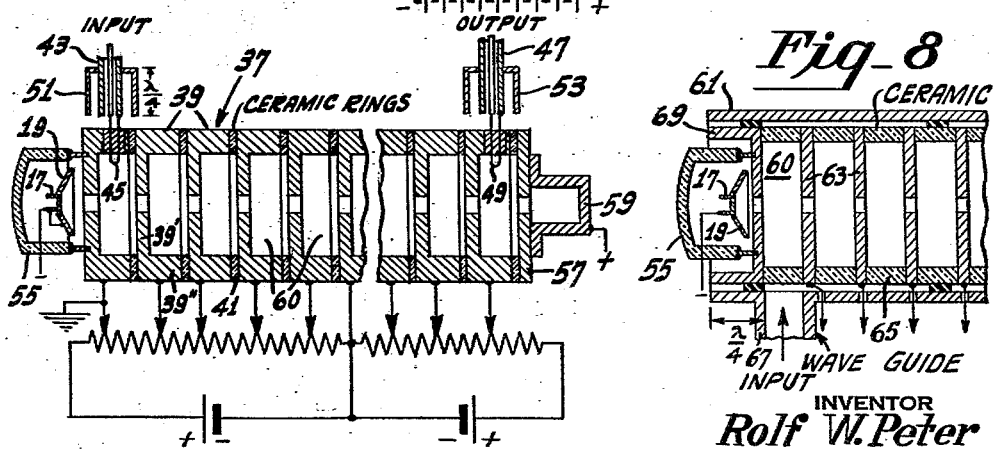
INVENTOR
Rolf W. Peter
BY
William A. Zalinak
ATTORNEY United States Patent Office 2,817,037
Patented Dec. 17, 1957

2,817,037

TRAVELING WAVE ELECTRON TUBES AND CIRCUITS

Rolf W. Peter, Princeton, N. J., assignor to Radio Corporation of America, a corporation of Delaware Application August 4, 1951, Serial No. 240,330

22 Claims. (Cl. 315—3.5)

The present invention relates to electron tubes and circuits therefor, and particularly to traveling wave amplifier tubes.

In a conventional traveling wave tube, an electron beam is projected along, and preferably through the center of, a hollow wave-guiding structure, such as an elongated helix, designed as a delay line to reduce the axial phase velocity of waves traveling therealong to a fraction, about one-tenth, of the velocity of light. The terms phase velocity or wave velocity where used herein, refer to the velocity of waves along the wave-guiding structure in the absence of a beam. The beam voltage is adjusted so that the initial axial beam velocity is substantially equal to the axial phase velocity and a signal is applied to the helix. The waves on the helix interact with the electrons in the beam to produce bunches, which in turn react back on the helix to increase the amplitude of the waves along the helix. Thus, an amplified signal is produced at the output end of the helix.

The amplification of the traveling wave tube is produced at the expense of the direct-current energy of the beam, and hence, except for very small signal operation, the resulting reduction in average beam velocity below the wave velocity toward the output end of the helix causes a substantial reduction in the gain of the tube. During the modulation of the beam by the signal, in the first part of the helix, there is a small increase in the average velocity of the beam, above the wave velocity along the helix, which causes a further but smaller reduction in tube gain. It has been suggested, in Llewellyn Patent 2,367,295, dated January 16, 1945, that these variations in beam velocity from wave velocity can be compensated for, in a somewhat similar, velocity-modulation tube having two separate, axially-spaced, input and output, dielectric-filled waveguides, by providing electrodes in the tube for producing a decelerating axial direct-current field along the input waveguide and an accelerating axial direct-current field along the output waveguide. In said patent, the initial average electron velocity is adjusted to correspond with the velocity of the wave through the guide, and the compensating direct-current fields are intended to maintain equality between the beam and wave velocities along the length of the tube.

Recent studies and experiments have shown that, for optimum gain in a traveling wave tube, the beam velocity should not be exactly equal to the phase velocity of the waves along the helix, but instead, should be higher than the phase velocity. Moreover, the optimum ratio of beam velocity to phase velocity is not constant, but varies as a function of tube length in the manner to be described.

The object of the present invention is to provide means for varying the ratio of the beam velocity to the phase velocity along the helix, or other wave-guiding structure of a traveling wave tube, in such manner as to maintain substantially the optimum ratio of beam velocity to phase velocity for maximum gain along the active length of the tube.

A feature of the invention is that the reductions in gain which would otherwise occur due to modulation of the beam and to energy given up by the beam to the circuit are automatically eliminated by the means utilized for maintaining the optimum ratio of beam velocity to phase velocity for maximum gain.

The invention will be more fully described in the following detailed description, taken in connection with the accompanying drawings, in which:

Fig. 2 is a graph showing the variation of optimum relative beam velocity with tube length;

Fig. 3 is a graph showing the variation of optimum beam voltage with tube length in a small signal level traveling wave amplifier tube embodying the present invention.

Fig. 4 is a graph similar to Fig. 3 for a high signal level amplifier tube;

Fig. 5 is an axial sectional view of a helix type traveling wave amplifier tube and circuit embodying one form of the invention;

Fig. 6 is a partly schematic view of a modification of Fig. 5;

Fig. 7 is an axial sectional view of a traveling wave tube of the baffle-loaded waveguide type embodying another form of the invention; and Fig. 8 is similar view of a modification of Fig. 7.

Figure 1:
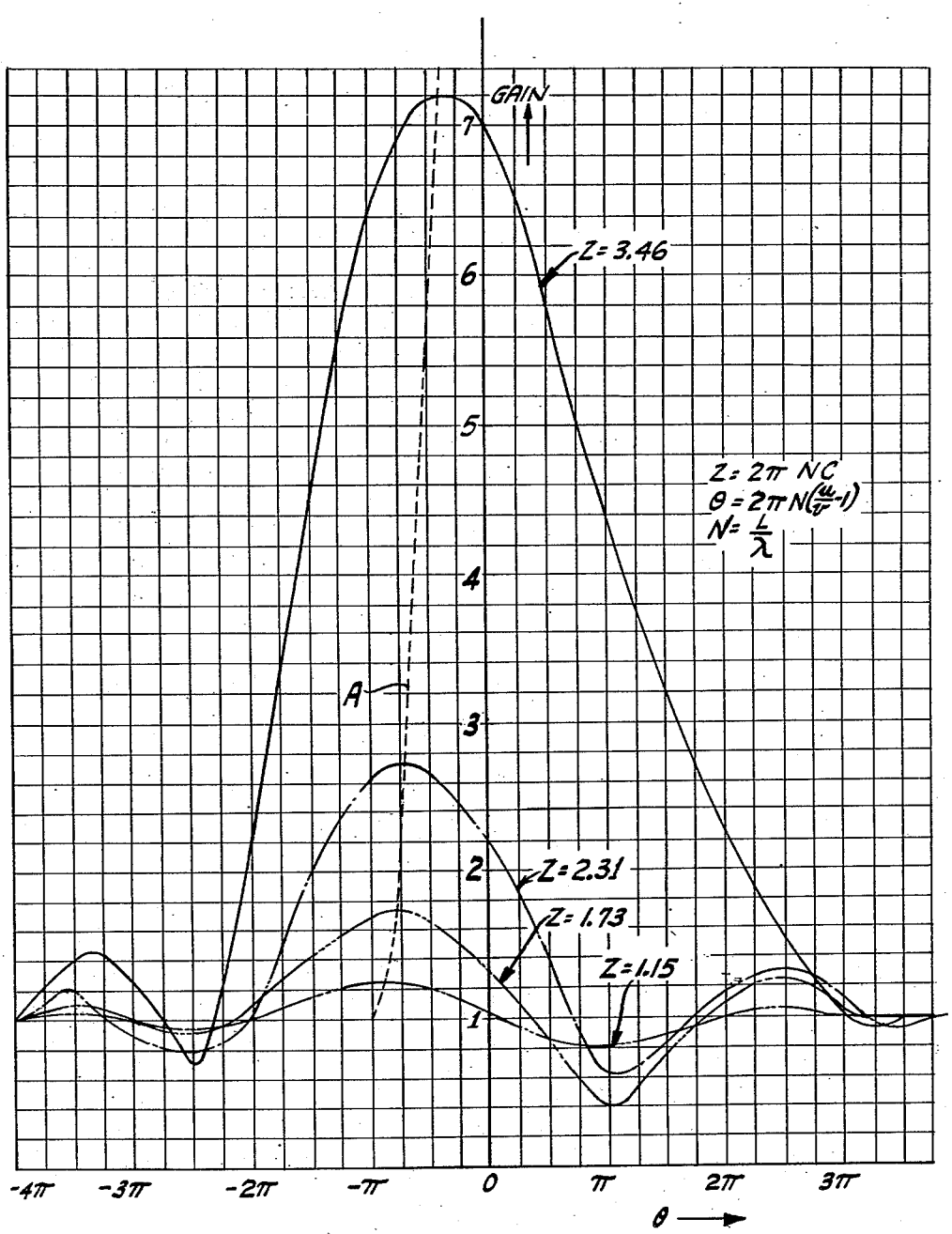
Fig. 1 is a graph showing a family of curves showing the variation of tube gain with relative beam velocity, for several values of a circuit parameter Z.

The basic theory of operation of the traveling wave amplifier tube has been published by R. Kompfner in a paper entitled "The centimeter-wave tube," in Wireless Engineer, September 1947, pages 255–266, and also by J. R. Pierce in a paper entitled "Theory of the beam-type traveling-wave tube," in Proc. of I. R. E., February 1947, pages 111–123.

The voltage gain of the tube at low level can be found by adding the initial voltage $V_1$, given by equation (51) of the Kompfner paper, to the sum $V_2$ of the voltages generated by the moldulated beam, given by equation (57) of the Kompfner paper, and dividing by the initial voltage $V_1$. The power gain is $$\left(\frac{V_1+V_2}{V_1}\right)^2 = K^2 - 2K \sin\frac{\theta}{2} + 1 \qquad (1)$$

where:

$$K = 2\frac{Z^3}{\theta^2}\left(\frac{\sin\frac{\theta}{2}}{\frac{\theta}{2}} - \cos\frac{\theta}{2}\right)$$

$Z$=the expression given by equation (60) of the Kompfner paper $$\theta = 2\pi \frac{L}{\lambda}\left(\frac{u}{v}-1\right)$$

$L$=length of the helix
$\lambda$=wavelength of signal
$u$=constant velocity of wave propagation along the helix without a beam
$v$=beam velocity.

The expression for $Z$ may also be conveniently written $$Z \equiv 2\pi NC$$

where:

$N$=number of wavelengths along the helix,
$C$=Pierce's well-known "gain factor," given by equation (19) of the Pierce paper.

The values of the power gain as calculated from Equation 1 for various values of $\theta$, and for four selected values of the circuit parameter $Z$, are plotted in Fig. 1. The vertical solid line at $\theta=0$ corresponds to the condition where the beam velocity is equal to the phase velocity. It will be noted that each of the four gain curves has the highest maximum at a value of $\theta$ between $-\pi$ and $0$, and that these maxima shift from the value $\theta = -\pi$ for very low gain or short interaction length to $\theta = 0$ for high gain or long tube length as shown by the dotted line A. The values of $\theta$ corresponding to these maxima in Fig. 1 are plotted in Fig. 2 against the parameter Z, which represents normalized tube length. The gain curves of Fig. 1 have been verified experimentally by varying the beam voltage and displaying the respective output of the tube on a cathode ray oscilloscope.

The curves of Figs. 1 and 2 show that, for maximum gain, the beam velocity should not be equal to the phase velocity, as heretofore thought, but instead, should be substantially higher, for most values of Z. The present invention makes use of this information to improve the gain of a traveling wave tube. In accordance with the invention, the tube is provided with means for controllably varying the beam velocity along the helix to maintain, substantially at least, the optimum ratio of beam velocity to phase velocity for maximum gain therealong.

As indicated in Fig. 2, $\theta$ should be equal to $-\pi$ at the input end of the helix, for maximum gain, or $$\theta_0 = 2\pi N\left(\frac{u}{v_0} - 1\right) = -\pi \qquad (2)$$

Hence, $$\frac{u}{v_0} = 1 - \frac{1}{2N} \qquad (3)$$

$$\frac{v_0}{u} = \frac{2N}{2N-1} \qquad (4)$$

In terms of voltages, the optimum ratio is $$\frac{V_0}{V_u}\left(\frac{v_0}{u}\right)^2 = 1 + \frac{1}{N} \qquad (5)$$

where $V_0$ is the voltage required to produce the optimum initial beam velocity $v_0$, and $V_u$ is the voltage required to produce a beam velocity equal to the phase velocity $u$. For example, for a helix which is 50 wavelengths long at a particular frequency of operation, the optimum voltage ratio from Equation 5 is approximately 1.02. This means that the voltage $V_0$ for the beam entering such a helix should be 2 percent higher than $V_u$, which is determined by the diameter and pitch of the helix, as indicated, for example, in Figs. 3 and 4.

The curve for optimum $\theta$ plotted against Z is close enough to a straight line that a fairly close approximation thereto can be produced merely by applying suitable different direct-current potentials to the ends of the helix to produce a linear potential gradient therealong, for voltage amplification at small signal level and medium gain, i. e., of the order of 25 db gain. This is indicated by the upper dash-dot line in Fig. 3, wherein the lower curved line represents the optimum ratio of beam voltage to equivalent phase voltage plotted against helix length L. In this case, the gain factor C is such that optimum voltage ratio approaches unity at the output end of the helix.

At a higher value of C, e. g., corresponding to 50 db gain, the optimum voltage ratio approaches unity intermediate the ends of the helix, as shown by the lower curved line in Fig. 3. Under such higher gain conditions, the beam velocity can be varied at substantially the optimum rate along the helix by producing a linear potential gradient along the first part of the helix and a constant potential along the remainder thereof, as indicated by the connecting dash-dot and dashed lines.

In voltage amplification at small signal levels, to which Fig. 3 applies, the alternating current components in the beam are small compared with the direct current components, and hence, the slight changes in average beam velocity due to energy interchange between the helix and the beam can be neglected. However, in a power amplifier traveling wave tube operated at high signal level, the variation in beam velocity along the output part of the helix due to the alternating current components of the beam is greater than the variation in optimum velocity ratio for maximum gain, and cannot be neglected.

In Fig. 4 is plotted an optimum distribution of voltage ratio along the length L of the helix of a power amplifier tube, for a given pair of values of C and signal level. About the first half of the curve is very similar in shape to the lower curve in Fig. 3, due to the relatively small effect of the modulation of the beam on the average beam velocity. The last half of the curve represents the increment of beam voltage necessary to compensate for the reduction in beam velocity that would otherwise occur due to energy given up by the beam to the helix. A first approximation to producing the optimum beam velocity is shown by the two dash-dot lines in Fig. 4, and involves the application of suitable direct-current potentials to the two ends and a mid-point on the helix. The beam voltage at the input end is substantially the same as that in Fig. 3, for the same value of N, that is, about 1.02 times $V_u$. A closer approximation to the ideal or optimum beam velocity distribution along the helix can be made by use of a large number of constant potential gradients, as illustrated in Figs. 7 and 8.

It will be understood that in the case of relatively short helices, such as a short helix for modulating one of the beams in a plural-beam growing wave tube, as disclosed and claimed in my copending application Serial No. 193,428, filed November 1, 1950, N will be relatively small, of the order of 10 to 20, and hence, the optimum ratio of beam velocity to phase velocity for maximum gain will be considerably higher at the input end of the helix than that indicated in the example shown in Figs. 3 and 4. If $N=10$, the ratio $V_0/V_u$ will be approximately 1.1.

Fig. 5 shows a conventional helix-type traveling wave tube in which provision is made for applying suitable direct-current potentials to the ends of the helix. The tube comprises a dielectric envelope 1 containing an elongated helical conductor or helix 3 of uniform diameter and pitch. The helix may be coaxially mounted in the envelope by means of three longitudinal dielectric rods 5, of which two are shown in Fig. 5, and a series of dielectric rings 7 which are notched to receive the rods 5. One end of the helix is axially extended as shown at 3' to couple with the field of an input waveguide 9 through which the tube extends. The end 3' is connected to a ring 11 which is capacity-coupled to a flange 9' on the waveguide 9. The other end 3" of the helix is similarly axially extended and coupled to an output waveguide 13, and connected to a cup-shaped collector 15 which is capacity-coupled to a flange 13' on the waveguide 13. Suitable means, such as a cathode 17, cathode shield 19 and an accelerating and focusing electrode 21, are provided to project an electron beam through the interior of the helix 3 to the collector 15. Preferably, a tubular shield 23 extends between the two waveguides.

In operation of the tube of Fig. 5, the ring 11, helix 3, collector 15, waveguides 9 and 13 and shield 23 are usually maintained at the same positive potential with respect to the cathode 17 and shield 19. This potential is usually adjusted so that the initial velocity of the beam when entering the helix 3 is substantially equal to the wave velocity along the helix which is determined by the circumference-to-pitch ratio of the helix.

In accordance with the present invention, a potential difference is established, by a direct current voltage source B, between the ends of the helix 3, which is made of a material having substantial electrical resistance. The potential of the input end of the helix is adjusted to a value, substantially higher than the wave velocity along the helix, which will produce maximum gain; and the potential of the other (collector) end of the helix is adjusted to make the beam and wave velocities substantially equal.

This corresponds to operation as indicated in Fig. 3 by the upper curve and dashed line shown. For a traveling wave receiving tube operating at medium signal level this will approximate the optimum ratio of beam velocity to wave velocity along the helix.

In order to approximate the optimum velocity ratio in receiving tubes operating at high signal level, or in power tubes, it becomes necessary to utilize more than one potential gradient along the helix. Figs. 6, 7 and 8 show several tube structures which may be used for this purpose.

Fig. 6 shows a two-section helix structure which may be substituted for the helix 3 in Fig. 5. This structure is made up of two aligned helices 25 and 27 of uniform diameter and pitch. The extreme ends of the helices 25 and 27 are connected to the ring 11 and collector 15, respectively, as in Fig. 5. The inner ends are connected, through separate high frequency chokes 29 and 31, to an intermediate point on the voltage source B. The adjacent ends of the two helices are provided for several turns with resistive coatings 33 and 35 of attenuating material, to prevent reflections of waves. The ring 11 is connected to a potential higher than that of the inner ends of the helices, and the collector 15 is connected to a still higher potential, as shown in the drawing. Thus, there is produced a potential drop along helix 25 and a potential rise along helix 27, corresponding to the two potential gradients shown by the dashed lines in Fig. 4. For operation according to the lower curve and dashed lines in Fig. 3, the increase in potential along helix 27 is eliminated.

If the helices 25 and 27 in Fig. 6 are made of uniform wire size and material, the potential gradient along each helix will be constant. If desired, each helix may be made in two or more connected sections having different wire size or material, and hence, different resistivity, to produce a variable gradient, or a non-linear potential distribution along the helix. By way of example, the sections may be designed to produce potential drops of 9 volts and 1 volt, respectively, along helix 25, and potential rises of 10 volts and 90 volts, respectively, along helix 27, in the direction of beam travel. It will be understood that the actual voltages will depend upon the parameters of the helix, such as wave velocity, length in wavelengths, etc. The use of four different potential gradients, as in Fig. 6, will approximate the optimum velocity ratio much closer than the two gradients of Fig. 4.

Figs. 7 and 8 show the invention embodied in another type of traveling wave tube, wherein the wave-guiding structure is a baffle-loaded waveguide, instead of a helical line. The waveguide structure 37 also provides the major portion of the tube envelope. A series of similar cup-shaped members 39, each made up of a centrally-apertured disc portion 39' and a lateral flange portion 39", are aligned and stacked with ceramic rings 41 of uniform axial thickness interposed between and hermetically sealed to each pair of adjacent members 39. The first of the members 39 may be coupled to an input coaxial line 43 by a coupling loop 45 extending in insulated relation through the flange 39", as shown. The last member portion 39 may be similarly coupled to an output coaxial line 47 by a coupling loop 49. These coaxial lines may be balanced by quarter-wave chokes 51 and 53, as shown. A cathode 17 and cathode shield 19 are mounted, in alignment with the apertures in the members 39, in a glass envelope portion sealed to the outside of the first member 39. The right hand end of the waveguide 37 is closed by an apertured disc 57 to which is attached a cup-shaped collector 59. The spaces between the disc portions 39' constitute a series of similar, connected cavity resonators 60.

In operation in accordance with the invention, the exposed edges of the various members 39 are individually connected to selected potentials on a voltage source S, as shown. The voltage source, connected between the cathode 17 and the first element of the baffle-loaded waveguide 37, for accelerating the beam to its initial beam velocity has been omitted for the sake of clarity in Fig. 7. In this arrangement a multiplicity of different potential gradients can be established along the beam path, so that the optimum velocity ratio can be very closely approximated.

In Fig. 8, a slightly different waveguide structure is utilized which is suitable for use with waveguide input and output. In this form, the flanges 39" of Fig. 7 are eliminated, and their function is performed by a tubular waveguide 61. The latter is capacity-coupled to a series of apertured baffle discs 63 which are uniformly spaced by ceramic rings 65. The input waveguide 67 is connected to waveguide 61 in position to transmit wave energy through the first ceramic ring into the cavity resonator 60 formed between the first two discs 63. The first disc 63 is coupled to the waveguides 61 and 67 by a quarter-wave flange 69. The beam-forming structure is the same as in Fig. 7. The output end of the tube (not shown) is similar to the output end of Fig. 7 but modified for waveguide output like the input end. In this arrangement the potential leads to the various discs 63 are led in insulated relation through apertures in the waveguide 61.

It will be understood that the structural embodiments shown are illustrative, and that other equivalent structures may be used within the scope of the appended claims.

What is claimed is:

1. A traveling wave amplifier comprising an elongated electrically continuous wave-guiding structure adapted to transmit an electromagnetic wave therealong at an axial phase velocity substantially less than the velocity of light, means for projecting a beam of electrons along and in energy-coupling relation with said structure with an initial beam velocity at the input end of said structure greater than the initial axial phase velocity, and means for varying the ratio of beam velocity to phase velocity substantially continuously along said structure to maintain approximately the optimum velocity ratio therealong for maximum gain.

2. An amplifier according to claim 1, wherein said ratio approaches unity in the direction of beam travel along at least a part of said structure.

3. An amplifier according to claim 1, wherein said structure is in the form of a helical conductor.

4. An amplifier according to claim 1, wherein said structure is in the form of an electrically continuous baffle-loaded hollow waveguide.

5. A traveling wave amplifier comprising a pair of spaced, axially-aligned conducting helices having a circumference-to-pitch ratio determining an axial phase velocity substantially less than the velocity of light, means for projecting a beam of electrons along and in energy-coupling relation with said helices in succession with an initial beam velocity at the input end of the first helix greater than the initial axial phase velocity, and means for varying the ratio of beam velocity to axial phase velocity substantially continuously along at least one of said helices to maintain approximately the optimum velocity ratio therealong for maximum gain.

6. A traveling wave amplifier comprising an elongated electrically continuous wave-guiding structure adapted to transmit an electromagnetic wave therealong at a constant axial phase velocity substantially less than the velocity of light, means including a cathode and a direct-current voltage source connected between said cathode and said structure for projecting a beam of electrons along and in energy-coupling relation with said structure at an initial velocity greater than said constant phase velocity, and means including said direct-current voltage source connected to said structure at axially-spaced points thereon for establishing a decelerating direct-current potential gradient along said structure between said points.

7. A traveling wave amplifier comprising an elongated electrically continuous wave-guiding structure adapted to transmit an electromagnetic wave therealong at a constant axial phase velocity substantially less than the velocity of light, means including a cathode and a direct-current voltage source connected between said cathode and said structure for projecting a beam of electrons along and in energy-coupling relation with said structure at an initial velocity at least equal to said constant phase velocity, means including said direct current voltage source connected to at least two spaced points on said structure for establishing a non-linear direct-current potential distribution along said structure between said points.

8. An amplifier according to claim 7, wherein said initial beam velocity is greater than said constant phase velocity, and the potential decreases in the direction of beam travel.

9. An amplifier according to claim 7, wherein the potential increases in the direction of beam travel.

10. A traveling wave tube comprising an elongated electrically continuous conducting helix of uniform diameter and pitch, and means for projecting a beam of electrons along and in energy-coupling relation with said helix, said helix having terminals for the application of different direct-current potentials thereto and comprising a plurality of connected sections having different resistivities between said terminals, whereby during operation of said tube a variable direct-current potential gradient may be established along said sections, for differentially varying the beam velocity along said helix.

11. A tube according to claim 10, wherein said sections are arranged in the order of decreasing resistivities in the direction of beam travel.

12. A tube according to claim 10, wherein said sections are arranged in the order of increasing resistivities in the direction of beam travel.

13. A traveling wave tube comprising an elongated wave guiding structure composed of a plurality of axially-aligned sections each adapted to transmit an electromagnetic wave therealong at a constant axial phase velocity which is substantially less than the velocity of light and is the same for all sections, means for projecting a beam of electrons along and in energy-coupling relation with said sections in succession, and means for producing a variable direct-current potential gradient along said structure comprising terminals connected to each of said sections for applying different direct-current voltages across said sections.

14. A traveling wave tube comprising a pair of spaced, axially-aligned, elongated conducting helices, and means for projecting a beam of electrons through said helices in succession, each of said helices having terminals for applying different direct-current potentials to the ends thereof, at least one of said helices being made up of a plurality of connected sections having different resistivities, whereby during operation of said tube a variable direct-current potential gradient may be established along said one of said helices.

15. A tube according to claim 14, wherein the helix nearest said beam projecting means is made up of two connected sections having different resistivities arranged in the order of decreasing resistivities in the direction of beam travel.

16. A traveling wave tube according to claim 13, wherein said sections are formed by an elongated tubular wave guide having a series of transverse baffle elements spaced along the interior thereof, said baffle elements having central apertures aligned with said beam projecting means and being insulated from each other for direct-currents.

17. A traveling wave tube according to claim 16, wherein said waveguide comprises a series of aligned, apertured conducting members spaced apart by dielectric rings, the inner portions of said members forming said baffle elements.

18. A traveling wave tube according to claim 17, wherein said members are hermetically sealed to said dielectric rings to form a portion of the tube envelope.

19. A traveling wave amplifier comprising an elongated electrically-continuous wave-guiding structure adapted to transmit an electromagnetic wave therealong at a constant axial phase velocity substantially less than the velocity of light, means for projecting a beam of electrons along and in energy-coupling relation with said structure at an initial velocity greater than said constant axial phase velocity, and means for establishing an axial decelerating direct-current potential gradient along a substantial part of said structure.

20. An amplifier according to claim 19, wherein said structure is in the form of a helical conductor.

21. An amplifier according to claim 19, wherein said structure is in the form of a baffle-loaded hollow waveguide.

22. An amplifier according to claim 1, wherein said axial phase velocity is substantially constant along said structure, and said last-named means comprises means for varying said beam velocity along said structure.

References Cited in the file of this patent

UNITED STATES PATENTS

| | | |
|---|---|---|
| 2,064,469 | Haeff | Dec. 15, 1936 |
| 2,541,843 | Tiley | Feb. 13, 1951 |
| 2,578,434 | Lindenblad | Dec. 11, 1951 |
| 2,584,597 | Landauer | Feb. 5, 1952 |
| 2,602,148 | Pierce | July 1, 1952 |
| 2,616,990 | Knol | Nov. 4, 1952 |
| 2,636,948 | Pierce | Apr. 28, 1953 |
| 2,672,572 | Tiley | Mar. 16, 1954 |
| 2,707,759 | Pierce | May 3, 1955 |